United States Patent [19]

McLaughlin et al.

[11] 3,911,406

[45] Oct. 7, 1975

[54] CORRECTION APPARATUS FOR USE WITH A READ ONLY MEMORY SYSTEM

[75] Inventors: Albert T. McLaughlin, Hudson, N.H.; John A. Recks, Chelmsford, Mass.

[73] Assignee: Honeywell Information Systems, Inc., Waltham, Mass.

[22] Filed: Apr. 1, 1974

[21] Appl. No.: 457,022

[52] U.S. Cl. .......... 340/172.5

[51] Int. Cl. .......... G06f 9/20; G06f 9/14

[58] Field of Search .......... 340/172.5

[56] References Cited

UNITED STATES PATENTS 3,768,075 10/1973 Reitsma et al. .......... 340/172.5

OTHER PUBLICATIONS

Irwin, J. W., *Read–Only Memory Patch Programming.* In IBM Tech. Disc. Bull. 14(8): p. 2325–2327, Jan. 1972.

Krewson, N. et al., *Patching a Holographic Read–Only Memory,* In IBM Tech. Disc. Bull. 9(10): p. 1363–1364, Mar. 1967.

*Primary Examiner*—Malcolm A. Morrison
*Assistant Examiner*—R. Stephen Dildine, Jr.
*Attorney, Agent, or Firm*—Faith F. Driscoll; Ronald T. Reiling

[57] ABSTRACT

A microprogram read only store includes a section for storing substitute microinstruction words which are referenced selectively by microprograms included within the other part of the same store. Each microinstruction word of the store includes a sentinel bit which when set to a predetermined state causes logic circuits to inhibit execution of that microinstruction word and cause the store to address the upper section of the store. During a next cycle of operation, a branch is made to the location specified in the upper section of the read only memory store. Microinstructions in the section are executed until a branch type microinstruction returns the store back to the microprogram under execution.

23 Claims, 11 Drawing Figures

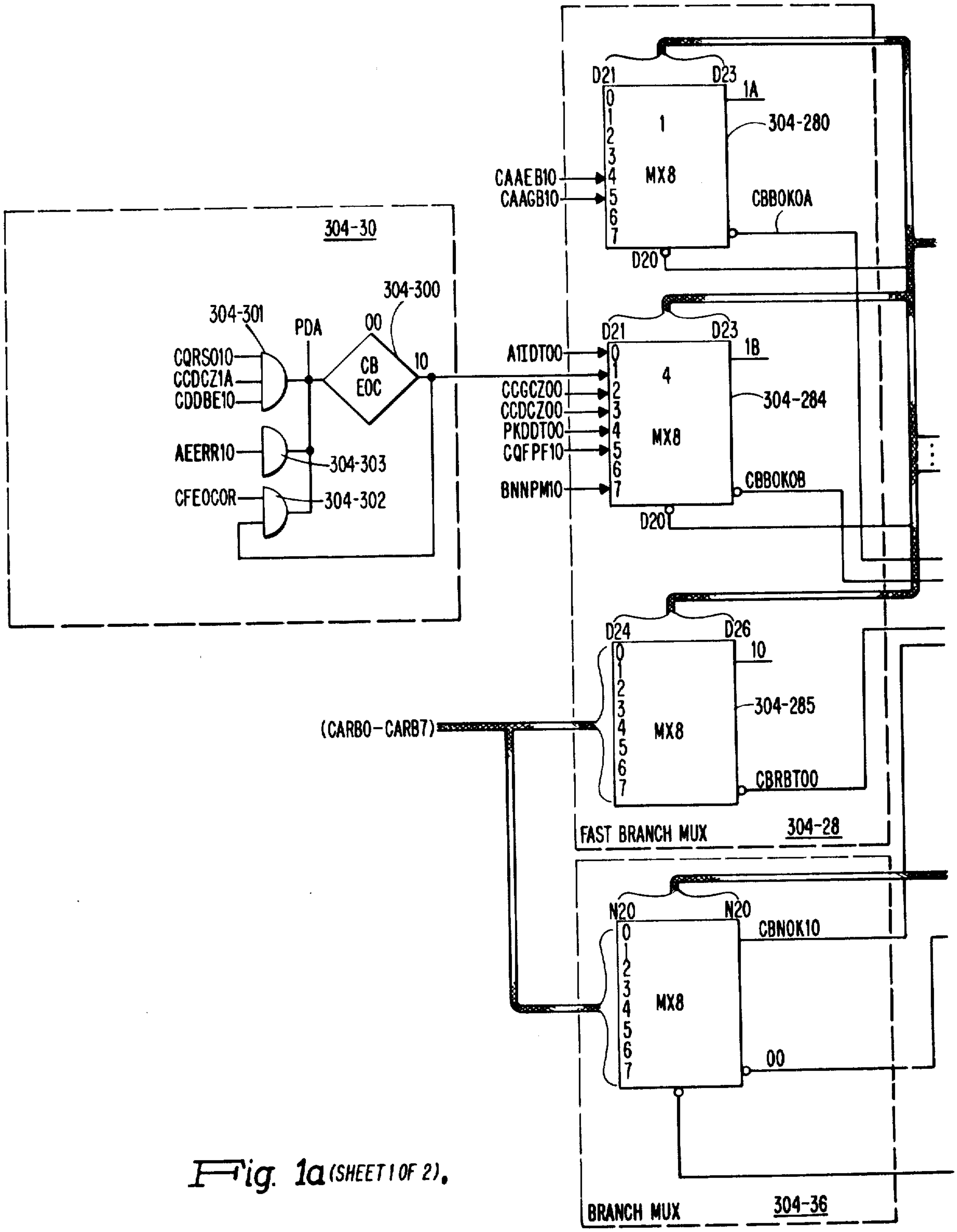
Fig. 1a (SHEET 1 OF 2).

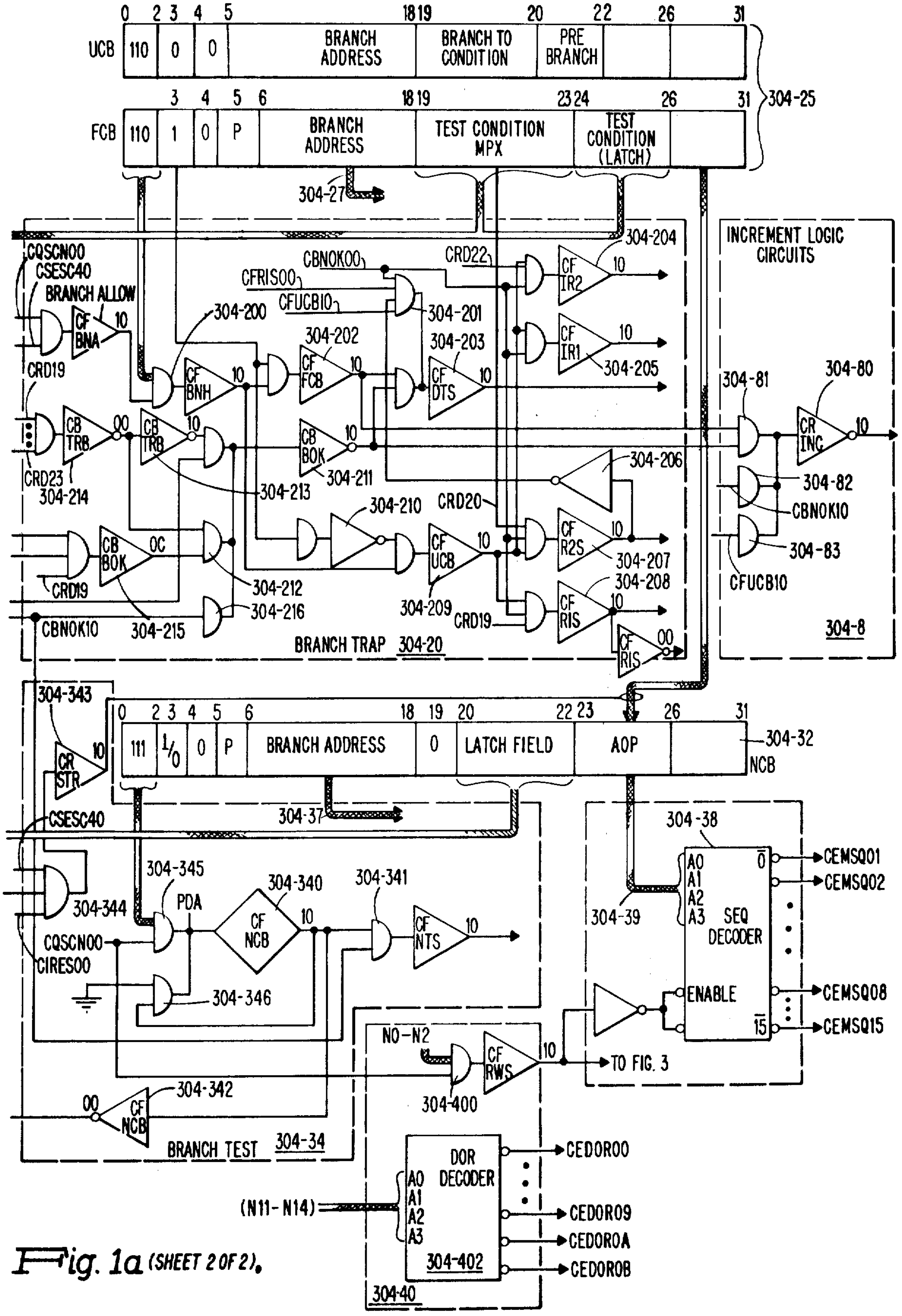
Fig. 1a (SHEET 2 OF 2).

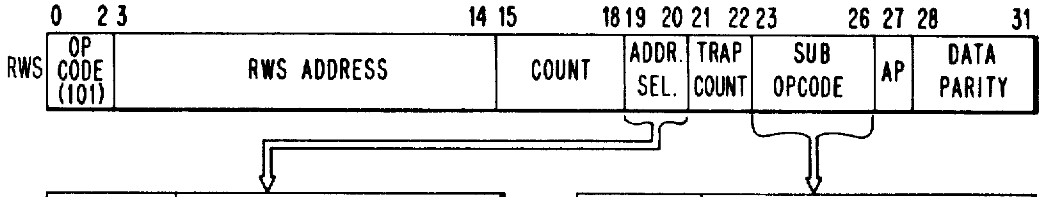

| | TABLE 1 |
|---|---|
| BIT 19, 20 | FUNCTION |
| 00 | NONE |
| 01 | USE CURRENT RWSAR AS RWS ADDRESS |
| 10 | USE 7 ROSLR BITS AND 4 LCN BITS AS RWS ADDRESS |
| 11 | USE 11 ROSLR BITS AS RWS ADDRESS |

| | TABLE 2 |
|---|---|
| BIT 23—26 | SUB OPCODE |
| 0000 | |
| 0001 | WRITE COUNT / HA / RO (AM) |
| 0010 | WRITE HA / RO (DM) |
| 0100 | READ COUNT / HA / RO |
| 0101 | SEARCH COUNT 1ST PASS |
| 0110 | SEARCH COUNT $\overline{\text{1ST PASS}}$ |
| 0111 | LOAD PARAMETER TABLE |
| 1000 | READ RWS (FIRMWARE) |
| 1001 | WRITE RWS FROM C REG. |
| 1010 | WRITE RWS FROM D REG. |
| 1011 | WRITE RWS FROM RWSLR |

Fig. 2a.

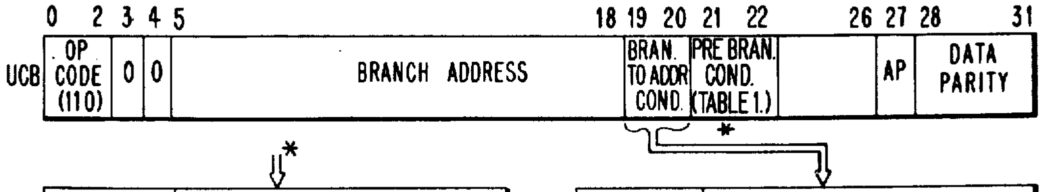

| | TABLE 1 |
|---|---|
| 21, 22 | FUNCTION |
| 00 | BRANCH W/O ANY ADDR. REG. SET |
| 01 | BRANCH W ROS RET ADDR REG 2 SET |
| 10 | BRANCH W ROS RET ADDR REG 1 SET |
| 11 | ILLEGAL |

| | TABLE 2 |
|---|---|
| 19, 20 | FUNCTION |
| 00 | BRANCH TO ADDR. SUPPLIED BY ROS |
| 01 | BRANCH TO RET ADDR REG 2 |
| 10 | BRANCH TO RET ADDR REG 1 |
| 11 | ILLEGAL |

Fig. 2b.

CORRECTION APPARATUS FOR USE WITH A READ ONLY MEMORY SYSTEM

BACKGROUND OF THE INVENTION

Field of Use

This invention relates to a microprogram store and more particularly to apparatus for altering or substituting microinstructions in microprograms included therein.

Prior Art

It is well known to employ a read only store for retaining microprograms. Normally, these memories are implemented using semiconductor circuits which include fuse links. Such memories are programmed by passing current through the fuseable links so as to open the links. This arrangement makes it possible for users to program the read only memory in the field.

Frequently, it becomes necessary during the development of a computer system to alter microinstructions contained in a read only store for the purposes of correcting errors or improving system performance. In general, this replacement operation has been accomplished by providing a separate eraseable memory store. An example of this type of system may be found in U.S. Pat. No. 3,748,653. In this system, a microprogrammed memory includes an updating eraseable memory which is operated in parallel with the read only memory and holds corrected information corresponding to erroneous information in the read only memory. The memory further includes an information selection device which is connected to the output terminals of both memories and enables transmission of only correct information either directly from the fixed memory or from the eraseable memory as a substitute for erroneous information held in the fixed memory.

The above arrangement requires additional logic circuits and storage circuits for controlling two separate memories making the arrangement more complex and costly. Also, an eraseable store has a disadvantage of requiring special loading facilities for inserting desired corrected information before the system can be operated.

Accordingly, it is a primary object of the present invention to provide a low cost device for facilitating the modification of a read only store.

It is another object of the present invention to provide a microprogram read only store including facilities for altering microprograms included within the store.

SUMMARY OF THE INVENTION

The above objects are achieved in a preferred embodiment of the present invention which comprises apparatus including a read only memory store which includes a predetermined section of memory coded to contain microinstructions which are substituted for microinstructions of microprograms included in the memory. Additionally, the read only memory provides sentinel bit storage for the microinstructions of microprograms stored in the read only memory. When the sentinel bit position is set to a predetermined state, circuits included in the apparatus inhibit the execution of the microinstruction from taking place and cause the read only store to branch to a substitute set of microinstructions in the predetermined section designated by an escape address read out concurrently with the microinstruction word. The escape addresses are obtained from another section included in the read only memory store of the invention.

The foregoing arrangement by providing a totally fixed or permanent storage for both microprograms and substitute or replacement microinstructions does not require special loading facilities when the system is initialized. Additionally, the arrangement requires only the addition of a special storage array for altering established microprograms. This in turn reduces the cost and adds to the reliability of the system. Since a single read only memory storage element is used, the access cycle times of storage locations containing the microprograms and the locations of storing corrections to the microprograms are always the same. This obviates the need for circuits to compensate for any timing differences which arise from using separate memories. When the array is inserted as part of the read only store, it replaces the array which corresponds to the upper storage section of the read only store. Thus, when there are no corrections required, the storage array provided for storing the correction microinstructions can be removed entirely or be replaced by a conventional array section. More importantly, the arrangement eliminates the need for additional external logic circuits for generating signals associated with the array since it is a part of the read only memory.

The above and other objects of the present invention are achieved in the illustrated embodiment described hereinafter. Novel features which are believed to be characteristic of the invention, both as to its organization and method of operation, together with further objects and advantages, will be better understood from the following description when considered in connection with the accompanying drawings. It is to be expressly understood, however, that each of the drawings is for the purpose of illustration and description only and is not intended as a definition of the limits of the present invention.

BRIEF DESCRIPTION OF THE DRAWINGS

FIG. 1*a* illustrates in greater detail the read only memory control store which utilizes the apparatus of the present invention.

FIGS. 2*a* through 2*f* illustrate the formats of several different types of microinstructions stored in the control section of FIG. 1.

DESCRIPTION OF THE PREFERRED EMBODIMENT

Figure 1:
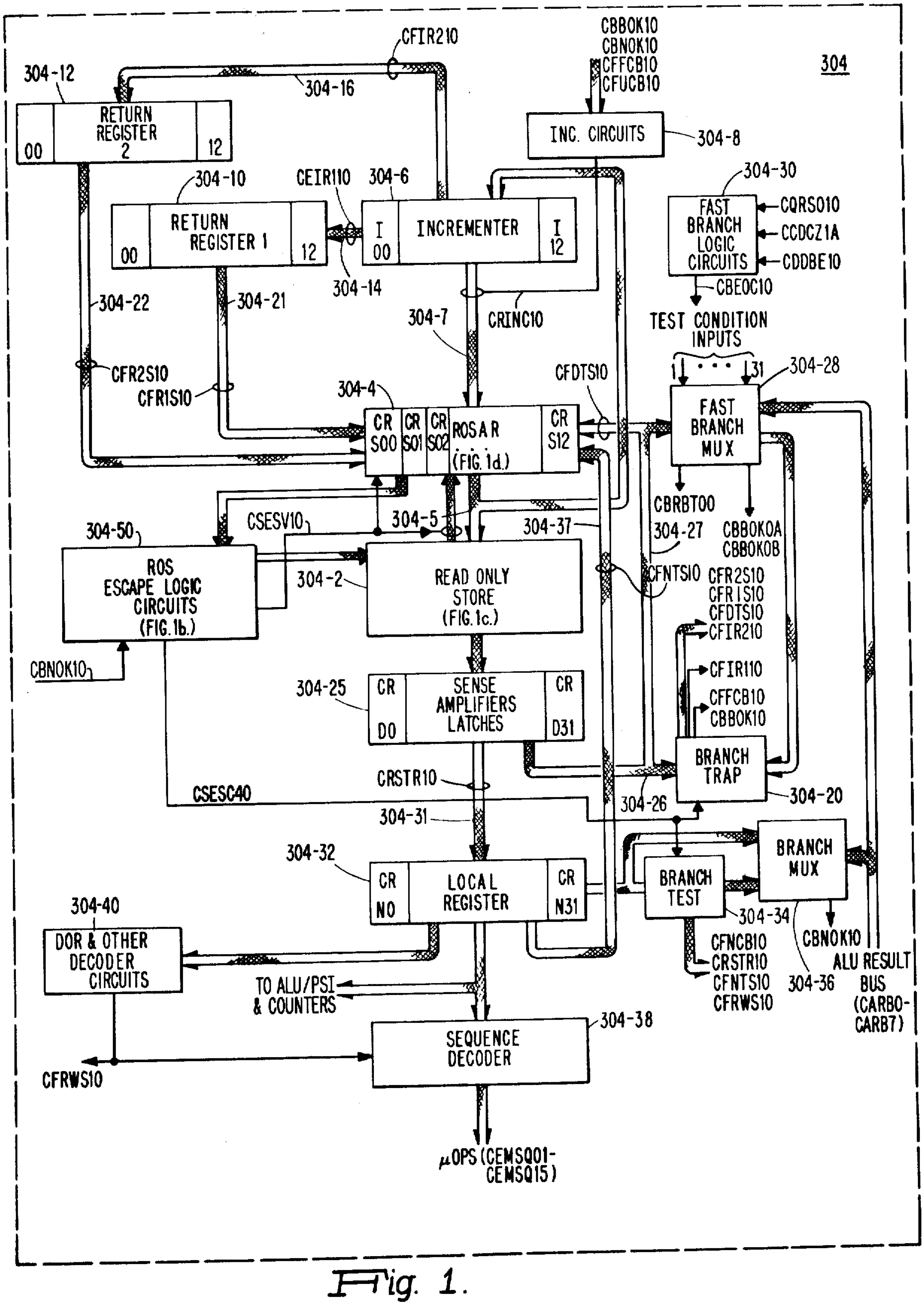
FIG. 1 is a block diagram of a control section of microprogrammed peripheral controller system which employs the apparatus of the present invention.

FIG. 1 shows the control section 304 of a microprogram peripheral processor system which employs the apparatus of the present invention. It is seen that the control section includes a read only memory 304-2, addressable via an address register 304-4 which applies a 13 bit address via a path 304-5. The same address is applied to an incrementer register 304-6. The register 304-6, conventional in design, enables its contents to be incremented by one and loaded into register 304-4 via path 304-7 when the control circuits of block 304-8 force an increment control signal CRINC10 to a binary ONE.

Additionally, the contents of register 304-4 are applied to a pair of return registers 304-10 and 304-12 via paths 304-14 and 304-16 respectively. The contents of register 304-6 are selectively loaded into one of the registers in response to one of a pair of signals CFIR110 and CFIR210 being forced to a binary ONE by the branch trap circuits of block 304-20. Similarly, the contents of return registers 304-10 and 304-12 are selectively loaded into address register 304-4 via path 304-21 and 304-22 in response to one of a pair of signals CFR1S10 and CFR2S10 being forced to a binary ONE by the branch trap circuits 304-20.

The contents of the address register 304-4 are also applied to logic circuits included within a block 304-50. Logic circuits 304-50 also apply a control signal CSESC40 to the circuits of blocks 304-20 and 304-34 selectively enabling and disabling their operation. Also, the circuits 304-50 apply signals to read only store 304-2 as shown.

When addressed, the store 304-2 applies signals to the sense latching amplifier circuits of a register 304-25 which are in turn applied to the branch trap circuits 304-20 for decoding and then to address register 304-4 via paths 304-26 and 304-27 respectively. When the branch trap circuits 304-20 decode a "branch" type microinstruction and the test conditions specified by the microinstruction is satisfied, the circuits force a signal CFDTS10 to a binary ONE which loads the contents of an address field into register 304-4. The store 304-2 then is caused to branch to the location specified by the address field of the "branch" type microinstruction.

Additionally, a portion of the contents stored in sense amplifier circuit 304-25 are applied to the multiplexer selector circuits of a fast branch mux block 304-28 which also receives a plurality of test condition input signals on input terminals 1-31, one of which is applied from the logic circuits of block 304-30 and input signals from an arithmetic and logic section, not shown, which correspond to bus signals CARB0-CARB7. The circuits of block 304-28 generate output signals representative of conditions being tested which are applied to the branch trap block 304-20.

The contents of amplifier circuits 304-25 are selectively applied to the flip-flop stages of a local register 304-32 via a path 304-31 and loaded into the register when the circuits included in branch test block 304-34 force a strobe signal CRSTR10 to binary ONE. As shown, portions of the contents of register 304-32 are applied to block 304-34 and to a multiplexer selector circuit included in a branch mux block 304-36. Additionally, the branch mux block 304-36 receives signals from the ALU result bus as shown. When the branch test block forces a signal CFNTS10 to a binary ONE, an address stored in register 304-32 is loaded into address register 304-4 via a path 304-37. As explained herein, this occurs in response to another type of branch microinstruction. The circuits included within a sequence decoder 304-38 generate micro-operation control signals in response to the signals applied via a path 304-39 from local register 304-32.

Microinstruction Formats

Before describing the various blocks of FIG. 1 in greater detail, the different types of microinstructions and their formats will be described with reference to FIGS. 2*a* through 2*f*.

Referring to FIG. 2*a*, there is shown a read/write store (RWS) microinstruction word which is used to control the address and data path of information to be read from or written into a read/write storage section, not shown, of the processor system. For further information regarding the read/write storage section as well as other sections, reference may be made to the copending application titled "Microprogrammable Peripheral Processing System" invented by John A. Recks et al. filed Dec. 18, 1973 bearing Ser. No. 425,760 and assigned to the same assignee as named herein. As seen from the Figure, this microinstruction word has an op code of "101" specified by bits 0 through 2. Bits 3 through 14 form a field which indicates the location in the read/write buffer storage for reading out or writing into a single byte. In the case for more than a single byte read/write operation, the contents of this location specify a starting address. The next field is a count field which includes bits 15 through 18. This field is used primarily for read/write or search count or header address operations which require either the reading or writing of information continuously from or to respectively the read/write buffer storage section. For example, the four bit count specified by this field can be loaded into the low order byte position of the data counter contained within section 318 while the rest of the stages of the counter are filled with zeros by the hardware.

Bits 19 and 20 serve as an address select field which can specify three ways by which the firmware can generate a read/write storage address. These ways are set out in the associated table. It is seen from this table that when this field is set to "01", the hardware utilizes the contents of the read/write storage address register without referencing the RWS address field of the microinstruction. When the field is set to "10", the firmware generates the read/write store address by loading a four bit current logical channel number (LCN) into bit positions 2 through 5 of a read/write store address register; the remainder of the address bits are taken from the RWS address field contained in the microinstruction. When this field is set to "11", the entire RWS address designated by the RWS address field of the microinstruction contained in the read only store local register is used.

Bits 21 and 22 serve as a trap count field and are used to specify the number of bytes which are to be masked in order to perform in various modes of operation. Bits 23 through 26 constitute a four bit field which is used to designate particular sequences required for read/write or search operations involving the storing of information into the scratch pad store of the read/write storage section. The table indicates the type of operations which are specified by different codings of the B sub op code bits.

FIG. 2b shows the format of an unconditional branch microinstruction. This microinstruction is one of two "fast branch" microinstructions which requires that the bits of the microinstruction be decoded from the sense amplifier latches in order to enable generation of a next microinstruction word address within one clock pulse time period. As implied from the name, this microinstruction is used to specify a non test branch operation for the purpose of calling in another microprogram or routine. The op code bits 0 through 2 as shown in FIG. 2*b* are coded as "110". Bit 3 is set to a binary ZERO to specify that this is an unconditional fast branch operation. Bits 21 and 22 correspond to a "prebranch condition" field which is used to specify the setting of a return address before the unconditional branch. More specifically, the read only storage control section 304, as mentioned, includes two branch return registers (i.e. return address register 1 and return address register 2) which are used to keep track of addresses when branching from one routine to another. As indicated by the table in FIG. 2*b*, when bits 21 and 22 are set to "00", branching occurs without requiring any return register to be set to a particular address. When the bits 21 and 22 are set to "10", the branching hardware is operative to increment by one the current address found in ROSAR (304-4) and store it into return address register 1 before branching to a new address. After the routine branch to has been completed, the contents of return address register 1 are used to return to the first or original routine. When bits 21 and 22 are set to "01", the return address register 2 is loaded with the address of the microinstruction after it has been incremented by 1. This address register provides a second level of branch return. As indicated by the same table, it is undesirable to set bits 21 and 22 to "11" because this will result in loading the same address into both address registers 1 and 2.

As indicated by the FIG. 2*b*, bits 5 through 18 constitute a 13 bit branch address wherein bit 18 is the least significant bit and bit 5 constitutes an odd parity bit. Bits 19 and 20 constitute a "branch to address condition" field which specifies the conditions indicated in the table. When these bits are set to "00", the store will branch to a location defined by the branch address of the microinstruction. When bits 19 and 20 are set to "01", the store branches to an address contained in return address register 1 while it will branch to the address contained in return address register 2 when these bits are set to "10". Similarly, bits 19 and 20 will not be set to "11" since this is defined as an illegal condition. Bits 23 through 26 normally contain all zeros since they constitute an unused field. The rest of the bits are as indicated.

Figure 2C:
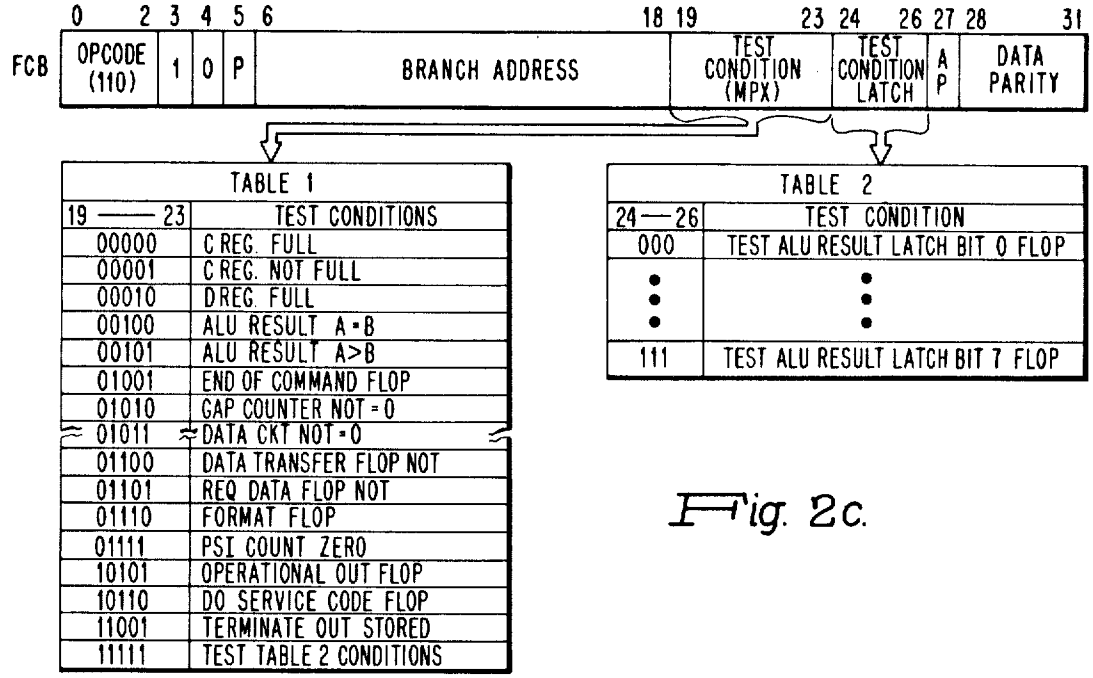

FIG. 2*c* shows the format of the second fast branch microinstruction which corresponds to a fast conditional branch (FCB) microinstruction. As shown, it has the same op code as the unconditional branch microinstruction but has bit 3 set to a binary ONE. Bit 4 is unused and is set to a binary ZERO and bit 5 is a branch address parity bit.

Bits 5 through 18 constitute a branch address field while bits 19 through 23 constitute a multiplex test condition field. The test conditions are defined as indicated in table 1 of FIG. 2*c*. There can be up to 30 flip-flops which are capable of being tested. The table indicates some of the more pertinent flip-flops. The test is made to determine whether or not flip-flop is in its binary ONE or set state. When this field is set to all ones, this indicates that none of the 31 test flops are to be tested but that one of the latches which receive the ALU result bus signals defined by bits 24 through 26 is to be tested. Bits 24–26 constitute a test condition latch field which is coded as indicated by Table 2. As explained herein, this field enables the contents of any one of the 8 bit registers delivered through the ALU section to be tested on a bit by bit basis.

Figure 2D:
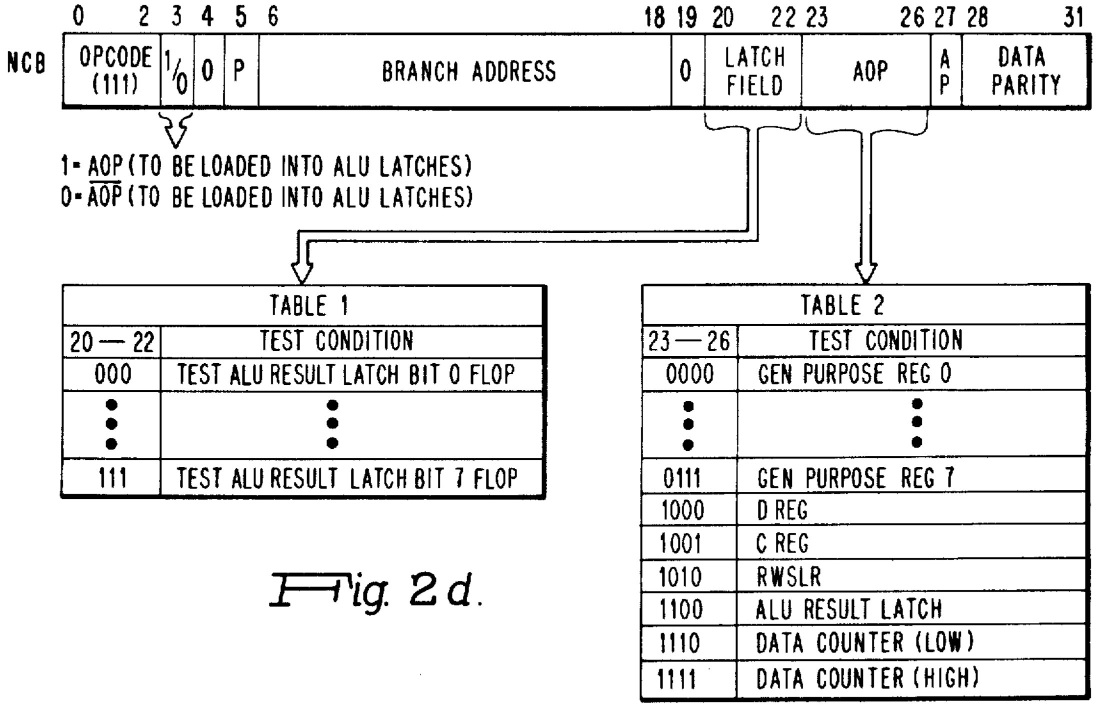

FIG. 2*d* illustrates the format of a normal conditional branch (NCB) microinstruction. Unlike the fast conditional branch and unconditional branch microinstructions, this microinstruction is decoded at the output of the read only store local register and requires an interval of two clock pulse periods to obtain the results of the test. The normal conditional branch microinstruction enables the testing of any bit position (binary ONE and binary ZERO states) of a register specified by the A operand field of the microinstruction. As seen from FIG. 2*d*, this microinstruction has an op code of "111". Bit 3 indicates whether the binary ONE or binary ZERO of outputs of the registers specified by the A operand field are to be tested. Bits 4 and 19 are unused fields and therefore set to binary ZEROS. Bits 5 through 18 constitute a branch address field while bits 20 through 22 constitute a latch field. As seen from the Figure, these bits when coded as indicated by Table 1 define the bit position of the ALU selected register to be tested. Bits 23 through 26 constitute the A operand (AOP) field which defines as indicated by Table 2 any one of 16 registers whose contents can be stored in the ALU latches.

Figure 2E:
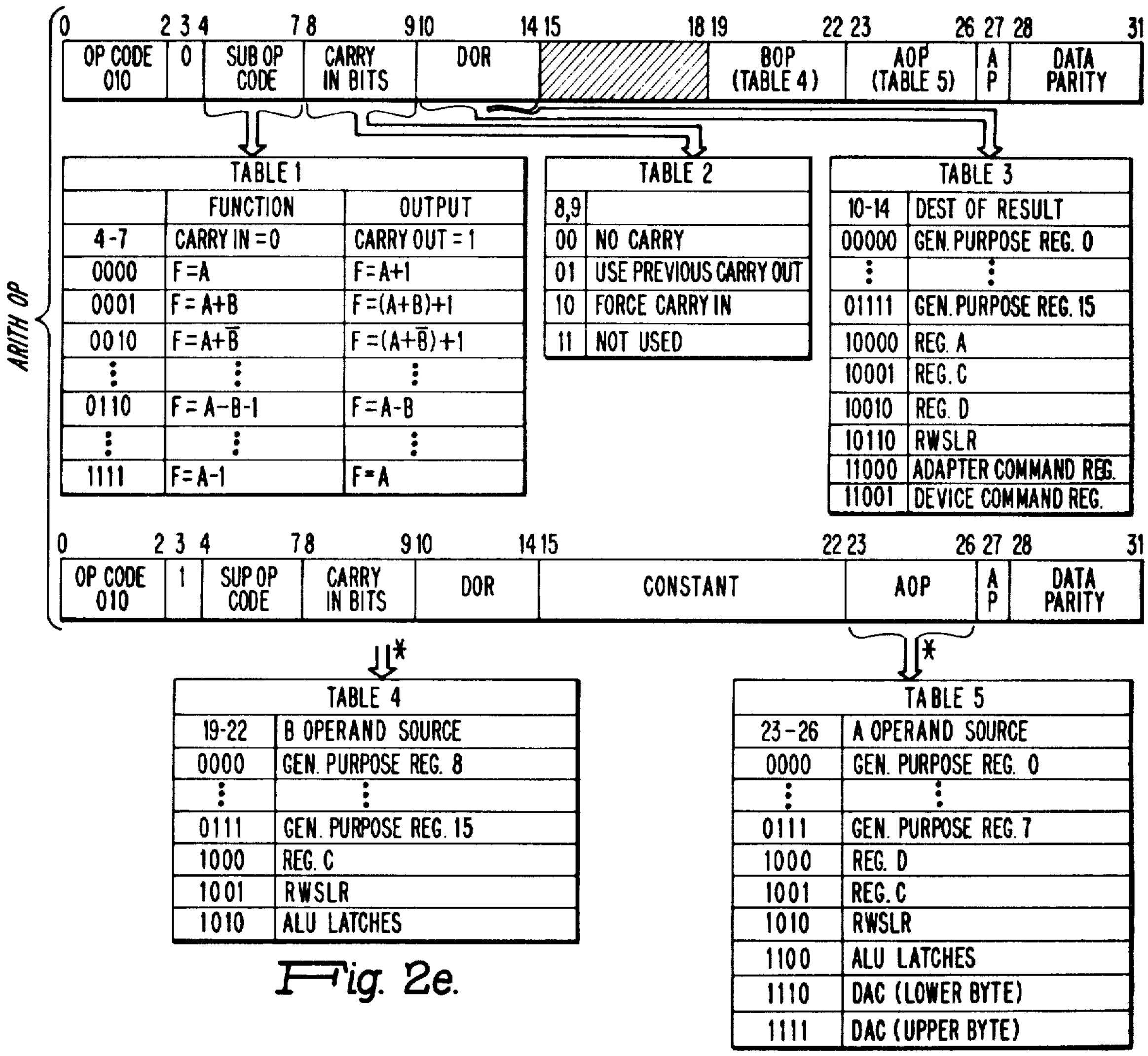

FIG. 2*e* illustrates two formats for microinstructions used for specifying different arithmetic operations. The arithmetic operation microinstructions include an op code "010". Bit 3 is used to indicate different formats of the microinstruction. Bits 4 through 7 constitute a sub op code field which defines up to 16 different arithmetic operations some of which are logical operations. Table 1 indicates certain ones of the arithmetic operations coded by bits 4 through 7. These operations are well known and therefore will not be described in greater detail herein. For further information, reference may be made to the aforementioned text published by Texas Instruments Inc. Bits 8 and 9 serve as a carry in field and are coded in accordance with Table 2 to specify three different carry in conditions for performing various arithmetic operations. Bits 15 through 18 are not used when bit 3 is a binary ZERO and therefore these bits are binary ZEROS. Bits 10 through 14 are coded as indicated by Table 3 to specify the destination of the result produced by an arithmetic operation. Bits 19 through 22 constitute a B operand (BOP) constant field which indicate the source of the B operand and in accordance with Table 4. Similarly, bits 23 through 26 indicate the source of the A operand in accordance with Table 5. It will be noted from FIG. 2f that when bit 3 is a binary ONE, bits 15 through 22 are used as the B operand.

Figure 2F:
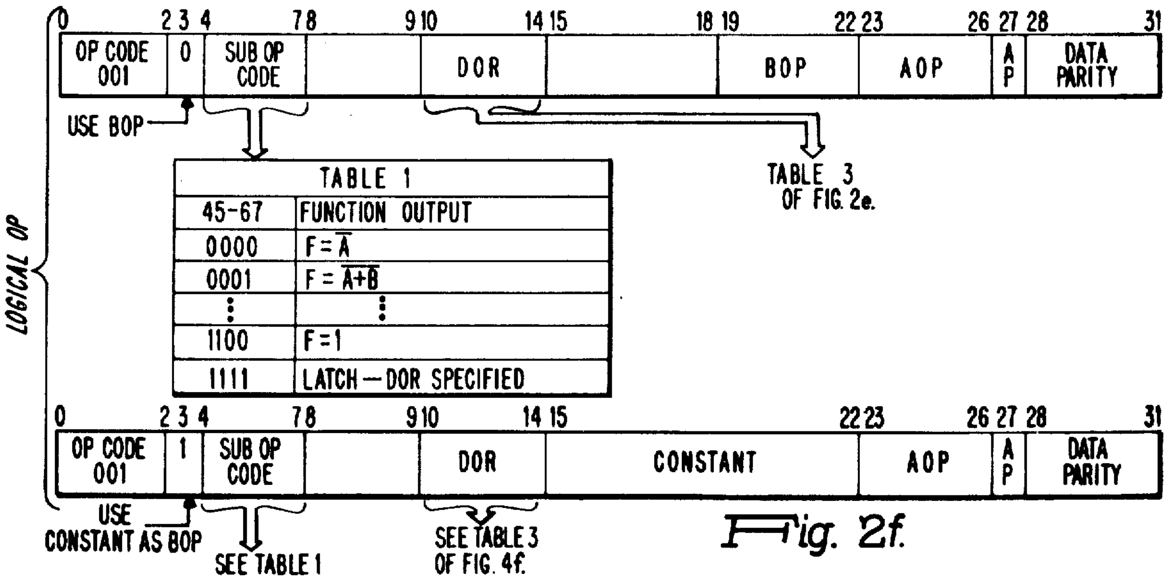

FIG. 2f illustrates two formats for microinstructions used for specifying different types of logical operations. The logical operation microinstructions include an op code "001". The state of a format bit 3 when a binary ZERO indicates that one of the registers designated in the table is to be the source of the B operand. When bit 3 is a binary ONE, the 8 bit constant field of the microinstruction is the B operand. Bits 4–7 of a sub op code field designate the logical operation to be performed by the ALU upon the A and B operands. Table 1 indicates some of the type operations. However, the aforementioned text published by Texas Instruments may be consulted for more information.

Bits 15 through 18 are not used when bit 3 is a ZERO. Bits 10–14 constitute a destination of ALU result field and is coded to specify one of the registers in the table indicated for receiving the result generated by the ALU. All codes, except 11110 and 11111, cause the result to be delivered to the designated register as well as storing it in the ALU latches. With codes 11110 and 11111, the result is not transferred to a register but is only stored in the ALU latches.

As mentioned above, bits 19–22 define the source of the B operand to the ALU when bit 3 is a ZERO. Bits 15–22 define the B operand when bit 3 is a binary ONE. Also, bits 8 and 9 are not used in this type microinstruction. Similarly, bits 23–26 define the source of the A operand to the ALU.

Detailed Descriptions of the Circuits of FIG. 1

With reference to FIGS. 1*a*, 1*b*, 1*c* and 1*d*, the various circuits of FIG. 1 will now be described in greater detail. Referring to FIG. 1*a*, it is seen that the branch trap block 304-20 includes the circuits 304-200 through 304-215 which are arranged as shown. As mentioned, these circuits generate the required signals during the execution of the two fast branch instructions which are directly applied to the circuits by sense amplifier latches 304-25. The signals produced by the branch trap circuits are generated in accordance with the following Boolean statements.

1. CFDTS10 (ROS DATA TO ROSAR) = CFUCB10 · CBNOK00 · CFR1S00 · CFR2S00 + CFFCB10 · CBBOK10.
2. CFFCB10 (Fast Conditional Branch) = CFBNH10 · CRD0310.
3. CFIR110 (incrementer to return Reg 1) = CFUCB10 · CBNOK00 · CRD2110.
4. CFIR210 (incrementer to return Reg 2) = CBNOK00 · CFUCB10 · CRD2210.
5. CFR1S10 (return Reg 2 to ROSAR) = CFUCB10 · CRD1910 · CBNOK00.
6. CFR2S10 (return Reg 2 to ROSAR) = CFUCB10 · CRD2010 · CBNOK00.
7. CBBOK10 (branch OK for FCB) = CBBOKOC · CBTRB00 + CBTRB10 · CBRBT00 + CBNOK10.
8. CBBOKOC (FCB Test conditions) = CBBOKOA · CRD1900 · CBBOKOB.
9. CFUCB10 (Unconditional Branch) = CFBNH10 · CRDO300.

The signals CBBOKOA, CBBOKOB and CBRBT00 are derived from corresponding ones of the multiplexer selector circuits 304-280 through 304-285 included within the fast branch MUX block 304-28. These circuits receive a number of input signals from various parts of the processor and these signals representative of certain test conditions are sampled and the results of the sampling are applied to the branch trap circuits 304-20 as shown. One of the inputs applied to multiplexer circuit 304-284 is signal CBEOC10 which is generated by a flip-flop 304-300 included within the fast branch logic circuits of block 304-30. As shown, this block includes this flip-flop together with associated gating circuits 304-301 through 304-302 arranged as shown.

Other test signals are also indicated in this Figure and are generated by various portions of the peripheral processor not shown.

It is also seen from FIG. 1*a* that the branch test circuits 304-34 includes the circuits 304-340 through 304-344 arranged as shown. These circuits are operative to generate branch signals in response to a normal condition branch microinstruction when stored in local register 304-32. Additionally, these circuits generate signals for enabling the sequence decoder circuit 304-38 which is operative to decode bits 23 through 26 of the normal condition branch microinstruction which are applied via path 304-39. The multiplexer selector circuits included within block 304-36 provide a branch signal CBNOK10 in response to testing one of the latches of the arithmetic and logic unit section, not shown, specified by latch field bits 20–22 of the microinstruction and finding it to be a binary ONE. The signal CBNOK10 is applied to the circuits included within block 304-8. As shown, this block includes the circuits 304-80 through 304-83. These circuits force an increment signal CRINC10 to a binary ONE in accordance with the following Boolean statement:

CRINC10 (increment ROSAR) = CBNOK00 · CFUCB00 · CRRES00) · (CFFCB00 + CBBOK00).

Control and Storage Circuits

Figure 1B:
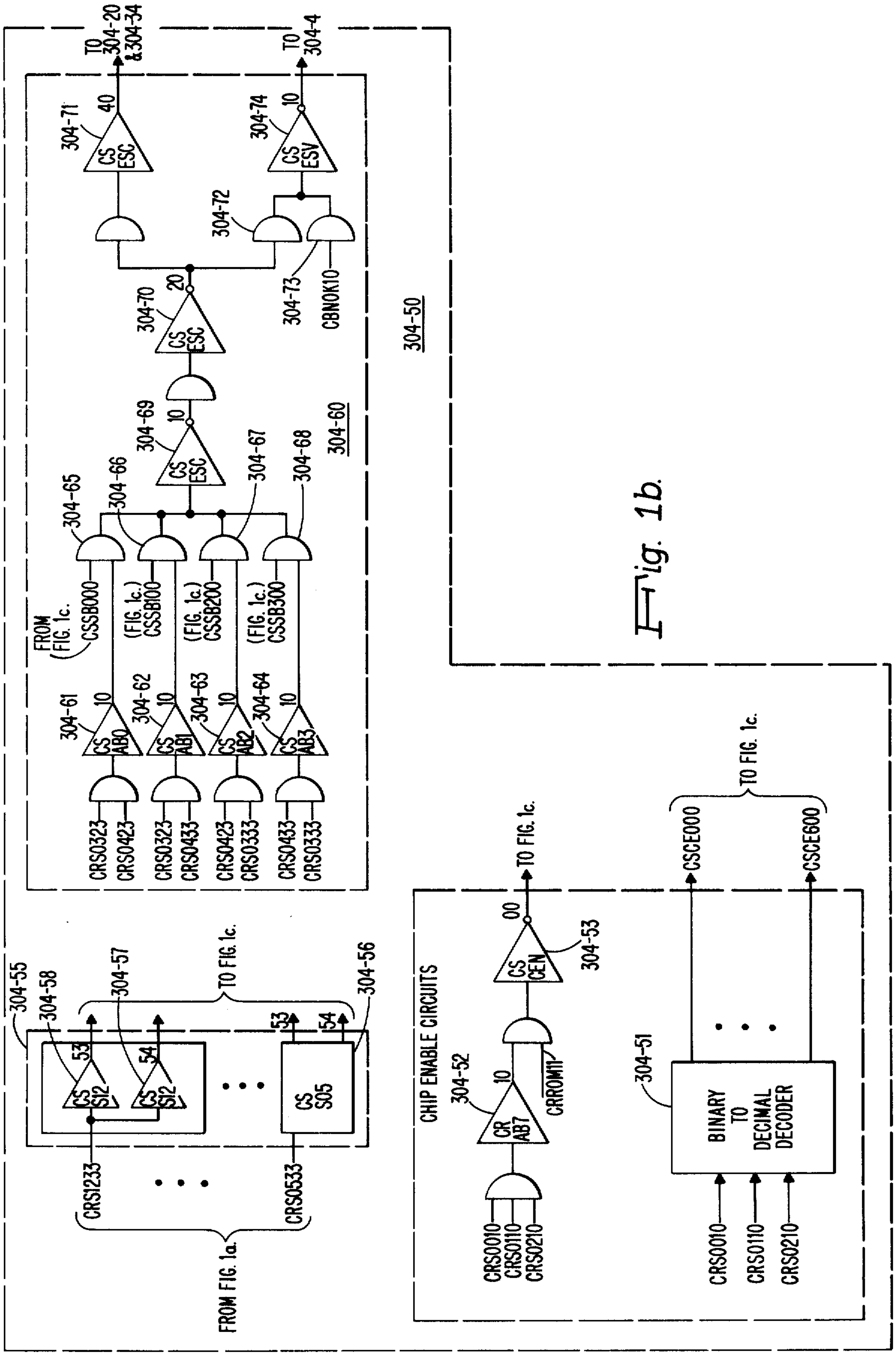
FIGS. 1*b* and 1*c* illustrate in greater detail the circuits of blocks 304-50 and 304-2 of FIG. 1*a* which comprises the apparatus of the present invention.

FIG. 1*b* shows certain ones of the control circuits for enabling different portions of the read only memory store 304-2, the branch test circuits 304-34 and branch trap circuits 304-20. As seen from FIG. 1*b*, the circuits include a plurality of amplifier circuits 304-56 through 304-58 each of which receive a different one of the address signals from bit positions 5–12 of the register 304-4 of FIG. 1. These circuits provide address signals for addressing locations of the upper "patch" section of read only store 302-2 in accordance with the present invention. That is, the address signals derived from the contents of bit positions 5–12 of the address register 304-4 are used to select one out of the possible 256 storage locations of upper section of read only store 304-2. Additionally, the same signals are applied to another portion of the read only memory store 304-2 shown in FIG. 1*c* which stores a number of "escape" addresses. The escape addresses read out are loaded into address register 304-4 in response to a control signal CSESV10 generated by the circuits 304-50. At the same time, signal CSESV10 is applied to the high order stages of the address register 304-4 and cause these stages to be switched to binary ONES.

Figure 1C:
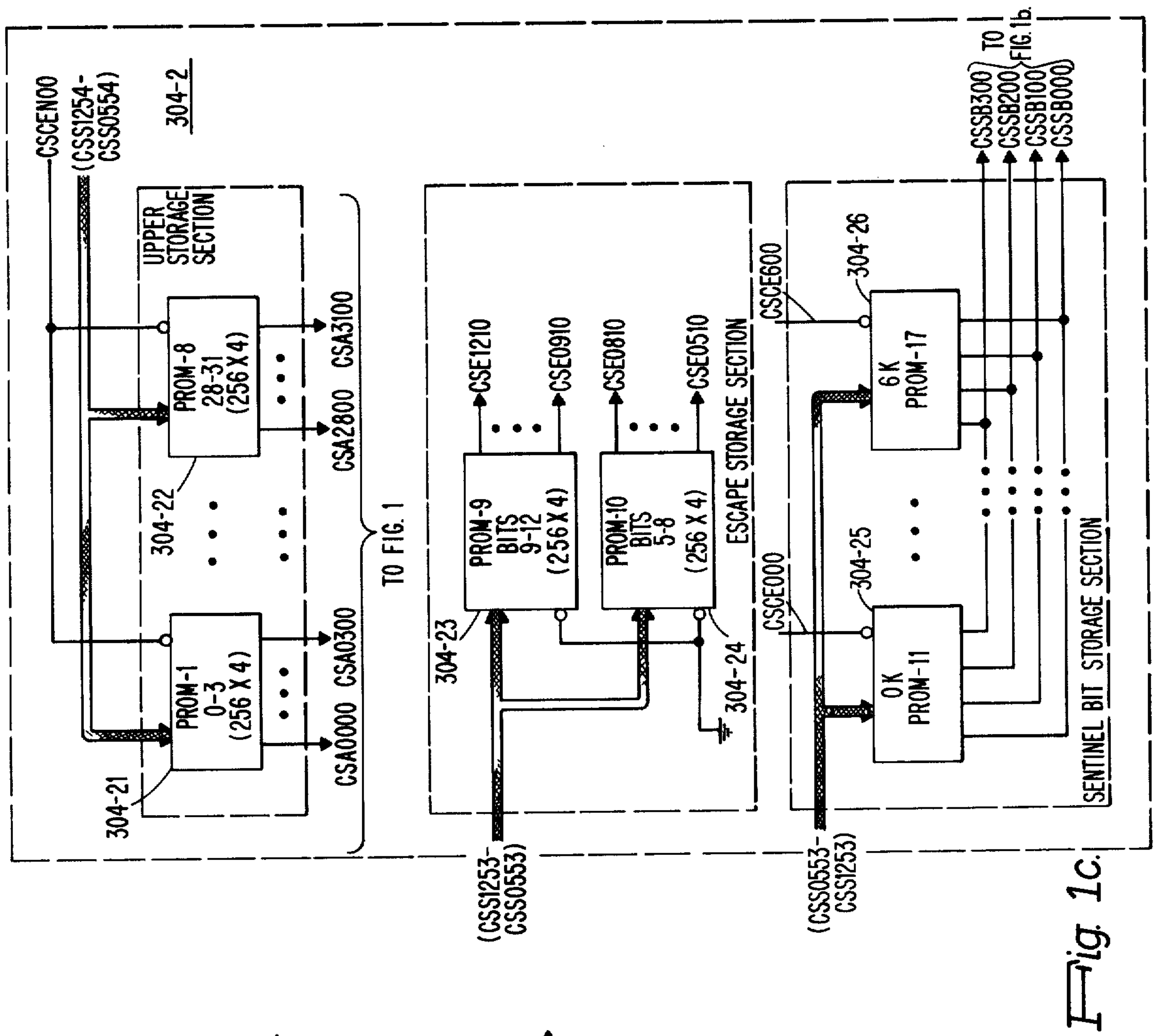
Figure 1D:
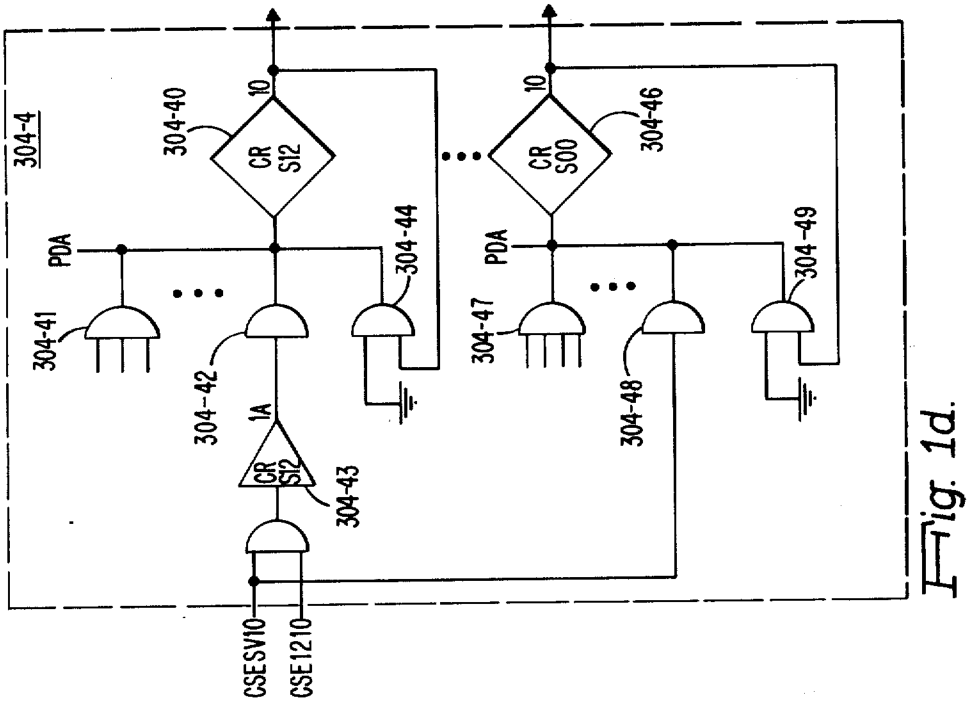
FIG. 1*d* shows in greater detail the address register 304-4 of FIG. 1.

FIG. 1*d* shows in greater detail two representative stages of the address register 304-4. The various sources of signals which are applied to these stages, not pertinent to the present invention, have been omitted. It is seen that these stages which correspond to flip-flops 304-40 and 304-46 include a plurality of AND gates 304-41 through 304-44 and 304-47 through 304-49 respectively.

The high order five bit positions of address register 304-4 each include an AND gate such as gate 304-48 which is enabled when signal CSESC10 is forced to a binary ONE which in turn switches its associated flip-flop to a binary ONE state. The remaining eight bit positions which correspond to bit positions 5–12 are enabled by an AND gate corresponding to gate 304-43 when signal CSESV10 and an escape bit signal such as CSE1210 are forced to binary ONES. This causes AND gate and amplifier circuit 304-43 to enable a gate such as gate 304-42 to switch the flip-flop to a state defined by the escape signal applied thereto. A clock pulse later, the flip-flop switches to a state defined by one of the gates not shown (i.e., normally the incremented address or branch address). In the absence of input signals applied to these gates, the flip-flop is switched to its binary ZERO state via an AND reset gate comparable to AND gate 304-44. However, this occurs only special conditions (e.g. initialization).

Referring to FIG. 1*b*, it is seen that the logic circuits 304-50 include a plurality of AND gate and amplifier circuits 304-61 through 304-64. Each of these circuits receives combinations of a pair of bit positions of address register 304-2. The contents of these bit positions are used to select an appropriate one of the sentinel bit storage locations of the read only store 304-2 for detecting whether the contents of the storage location being addressed within the read only memory are to be altered. The sentinel bit signals correspond to signals CSSB000 through CSSB300. When one of the signals CSAB010 through CSAB310 is forced to a binary ONE indicating the address of the read only memory location referenced and the corresponding sentinel bit position is set to a binary ZERO indicating the presence of a sentinel bit, this in turn causes an inverter circuit 304-69 to switch signal CSESC10 from a binary ZERO to a binary ONE. Conversely, when the sentinel bit position is set to a binary ONE, indicating the absence of a sentinel bit, signal CSESC10 remains a binary ZERO. In the present arrangement, four read only memory locations share one escape address location.

A further inverter circuit 304-70 when forced to a binary ZERO causes a gate and amplifier circuit 304-71 to force signal CSESC40 to a binary ZERO. This signal appropriately conditions the branch trap circuits 304-20 and branch test circuits 304-34 to prevent a branching operation from taking place. At the same time, a gate circuit 304-72 and inverter circuit 304-74 causes signal CSESC10 to condition the stages of the address register 304-4 for addressing an appropriate location within the read only store 304-2. If gate 304-73 is enabled in response to branch signal CBNOK10 being a binary ONE (i.e. when a normal conditional branch microinstruction is stored in ROS local register and condition being tested is true), inverter circuit 304-74 switches signal CSESV10 to a binary ZERO allowing a normal branch to be executed upon the occurrence of a next PDA clock pulse. At that time, signal CSESV10 inhibits the escape address signals from being loaded into the ROS address register thereby preventing substitutions of microinstructions from taking place.

Block 304-50 also includes a binary to decimal decoder circuit 304-51, conventional in design, which operates in response to the high order three bits of the address register 304-2 to select an appropriate portion of the read only store sentinel bit storage of FIG. 1c. Also, the high order bit signals from the address register 304-2 are applied to an AND gate and amplifier circuit 304-52 together with a signal CRROM11. The last mentioned signal is a binary ONE when the apparatus of the present invention has been added to the read only memory store 304-2. An inverter circuit 304-53 is operative to force an enabling signal CSCEN00 to a binary ZERO when both these signals CRAB710 and CRROM11 are forced to binary ONES. The signal CSCEN00 is used to enable the upper storage section of the read only memory store of FIG. 1*c*.

Referring now to FIG. 1*c*, it is seen that in accordance with the present invention, the read only store 304-2 includes three different groups of read only memory chips. The first group of read only memory chips which corresponds to blocks 304-21 and 304-22 provides 256 locations, each containing 32 bit positions. This storage is coded to include the modifications and/or substitutions/corrections to be made to the remaining portions of the read only store 304-2. Another group of read only memory chips corresponds to blocks 304-23 and 304-24. It is these chips which furnish the escape storage addresses which are loaded into the low order bit positions of the address register 304-4. At the same time, the high order five bit positions of the same register are forced to binary ONES. The last group of chips is used to contain the sentinel bit storage for each of the storage locations of the read only memory store. More specifically, these chips provide 7K (7168 bits) of sentinel bit storage which corresponds to the original fixed storage capacity of the read only store 304-2 of the present invention. All of the read only memory chips are constructed of conventional circuits such as those disclosed in an article titled "Field Programmable Read Only Memories and Applications" by David C. Uimari which appears in the December, 1970 issue of "Computer Design" published by Computer Design Publishing Corporation.

Description of Operation

With reference to FIGS. 1, 1*a* through 1*d* and FIGS. 2*a* through 2*f*, several examples will be presented illustrating the manner in which the apparatus of the present invention facilitates making changes to the read only store of FIG. 1.

In the first example, it is assumed that it becomes necessary to add three microinstructions to a subroutine stored in the read only memory store 304-2. The change would be designated as follows:

| ROM Address | Sentinel Bit | Escape Address | New Address | Remarks |
|---|---|---|---|---|
| 08F3 | 1 (2K) | 00 | IF00 | Repeat 08F3 |
| | 0 | | IF01 | New microinstruction |
| | 0 | | IF02 | New microinstruction |
| | 0 | | IF03 | New microinstruction |
| | 0 | | IF04 | UCB 08F4 |

where the designations given appear in hexadecimal code.

In this example, it is assumed that first microinstruction follows a microinstruction stored at hexadecimal address 08F3. The sentinel bit storage location for that address is set to a binary ONE and a first one of the 256 locations of the substitute storage is selected and in that location the microinstruction contained in that address is repeated as indicated. In the next three addresses in sequence, the new microinstructions are inserted in order. In the fourth address, an unconditional (UCB) branch type microinstruction is inserted and has its address field coded to have a branch address which corresponds to the next storage location in the subroutine (i.e. 08F4).

Assuming this change has been made, the circuits of the read only memory control store operate in the following manner. During a first cycle of operation, the storage location identified by address "08F3" is read out to the sense amplifier latch circuits 304-25. Concurrent therewith, the address signals contained in address register 304-4 are applied to the sentinel bit storage read only memories of FIG. 1*c*. Since the read only memory sentinel bit storage location associated with this location contains a binary ONE sentinel bit, this causes an appropriate one of the AND gate circuits 304-65 through 304-68 to force the escape signal CSESC40 from a binary ONE to a binary ZERO. This signal as seen from FIG. 1a prevents generation of branch active signal CFBNA10 so as to inhibit the branch trap circuits 304-20 from decoding either a fast conditional branch or unconditional branch microinstruction. At the same time, the escape signal CSESC40 forces strobe signal CRSTR10 to a binary ZERO thereby inhibiting the loading of the microinstruction bit signals into local register 304-32.

In addition to the above, the escape valid signal CSESV10 is forced to a binary ONE which in the absence of a normal branch microinstruction previously having been stored in local register 304-32 causes the contents of the escape address location therewith to be loaded into the low order bit positions of address register 304-4.

At the same time, control signal CSESV10 forces the high order five bit positions of the address register 304-4 to binary ONES. This causes the upper storage area of read only memory store 304-2 to be addressed. This storage corresponds to read only memory chips 304-21 through 304-22. As seen from FIG. 1c, addressing of the upper section forces chip enable signal CRAB710 to a binary ONE enabling these chips for operation. During a next cycle of operation, the microinstruction word contained in location "1F00" is read out to the sense amplifier latch circuits 304-25. The microinstruction word is executed as any other microinstruction word. Since the location addressed does not contain a sentinel bit set to a binary ONE, signals CSESC40 and CSESV10 are returned to their original states so as to enable normal execution of the microinstruction words included in the section. The address contained in the address register 304-4 is incremented by one in a conventional fashion each time signal CRINC10 is forced to a binary ONE. Addressing of this area of memory continues until the fifth microinstruction is executed. That is, the unconditional branch microinstruction is read out from the upper section of the read only memory store 304-2 and executed in a normal fashion. This causes the unconditional branch address contained within the microinstruction to be inserted into address register 304-4 in the normal manner returning, the read only store to the original routine. In this operation, branching occurs without requiring any return register to be set to a particular address. Therefore, bits 4 and 5 of the microinstruction are set to "00". Bits 6 through 18 are coded to contain the address "08F4" while bits 19 and 20 are set to 00 so the read only store branches to the location defined by the 12 bit branch address of the microinstruction. Thus, the address is loaded into register 304-4 when the branch trap circuits 304-24 force signal CFDTS10 to a binary ONE completing the unconditional branch operation.

It will be appreciated that in some instances it may be desirable only to substitute a single microinstruction for a microinstruction contained within the read only store 304-2. The following example illustrates such a change.

| ROM Address | Sentinel Bit | Escape Address | New Add | Remarks |
|---|---|---|---|---|
| 0684 | 1 (1K) | 05 | 1F05 | New microinstruction |
| | 0 | | 1F06 | UCB 0685 |

Here, it is assumed that the microinstruction changed has a hexadecimal address of "0684". The sentinel bit storage location of the appropriate read only memory chip is set to a binary ONE as indicated. Assuming this change is made in addition to the above change, the sixth location designated by an escape address of 5 is coded to include the new microinstruction. The seventh location is coded to contain an unconditional branch microinstruction having a branch address corresponding to the next address in that original sequence (i.e. hexadecimal address 0685).

In operation, the apparatus of FIG. 1 is operative to address location 0684 which in turn causes the generation of escape signal CSESV10 and CSESC40 to their appropriate states. This conditions the branch trap circuits 304-20 and branch test circuits 304-34 to inhibit the execution of a branch operation and cause the corresponding escape address signals from the read only memory chips of FIG. 1c to be loaded into the address register 304-4. Also, the high order five bit positions of the address register 304-4 are forced to binary ONES causing the read only store 304-2 to branch to the upper section which contains the substitute microinstruction word. Also, signal CRAB710 is forced to a binary ONE, enabling the chips of the upper section for operation.

During the following cycle of operation, the new microinstruction word is read out from the sixth storage location and executed in a conventional manner. The address contents of the register 304-4 are incremented by one and cause the addressing of the next microinstruction word contained within the upper section of store 304-2. This microinstruction word is an unconditional branch microinstruction which returns the read only store 304-2 to the original routine or sequence. Specifically, this microinstruction word is executed in a conventional fashion and causes the read only store 304-2 to branch to the address "0685". It will be appreciated that other types of branch microinstruction if included in the sequence of microinstructions would also return the read only store to the original routine. For example, a normal conditional branch or fast conditional branch microinstruction would return the read only store to the routine when the condition being tested is present. However, at least one unconditional branch microinstruction would normally be included in the microprogram segment resident in replacement area.

From the above examples, it can be seen that many modifications and changes can be made to the read only store utilizing the apparatus of the present invention (e.g. the use of any types of instructions, branch instruction, expansion of storage capacity, different types of permanent read only storage etc.). It can be further seen from these examples that the modification or changing of updated microprograms in the store is made by the addition of a minimum amount of circuits. Also, the arrangement of the present invention maximizes the use of common circuits already present in the read only control section of the present system. Additionally, because the circuits of the present invention can be included in their entirety on the circuit board structure normally provided for the upper portion of the read only store, the apparatus of the present invention is easily installed within the read only control section. Obviously, when no changes are required to be made to the read only store, the apparatus can be eliminated and in its place included 1K storage.

While in accordance with the provisions and statutes, there has been illustrated and described the best form of the invention known, certain changes may be made to the apparatus of the present invention without departing from the spirit and scope of the invention as set forth in the appended claims and that in some cases, certain features of the invention may be used to advantage without a corresponding use of other features.

What is claimed is:

1. A modifiable microprogram store system comprising:

an unalterable read only store including;

a plurality of like constructed addressable sections, a number of said sections including a like number of storage locations for storing microinstruction words, one of said plurality of sections arranged to store a number of addresses for referencing storage locations within a predetermined one of said number of sections and another one of said plurality of sections for storing control signals indicating when a altering of the microinstruction word contents of storage locations in said number of sections is required, an address register coupled to each of said sections for storing address signals for designating storage locations within said sections selected to be referenced during cycles of operation, an output register coupled to said sections for receiving the microinstruction word contents of a storage location of said section referenced during a cycle of operation to be executed by said system; and, control means coupled to said output register and to said address register, said control means including;

logic sensing means connected to be responsive to control signals from said another one of said sections to inhibit a transfer to said output register of the microinstruction word contents of a storage location referenced during one cycle of operation and address control means coupled to said logic sensing means and responsive to said control signals to load said address register with the address contents of a storage location from said one of said sections addressed during said one cycle of operation for referencing an initial storage location within said predetermined one of said sections for read out during a next cycle of operation of a first substitute microinstruction word to said output register for execution by said system.

2. The system of claim 1 wherein said store includes incrementing circuit means coupled to said address register, said incrementing means being operative during each cycle of operation to increment by one the contents of said address register for referencing successive locations therein and said address register being conditioned by said incrementing means to reference sequential storage locations within said predetermined one of said number of sections until read out of a predetermined type of microinstruction word.

3. The system of claim 2 wherein said read only store further includes decoding means coupled for receiving signals representative of the type of microinstructions read out from said number of sections, said decoding means being conditioned by said predetermined type of microinstruction contained within said predetermined one of said number of sections to generate signals to cause said read only store to return to a next storage location in a section having the storage location signaled as requiring alteration.

4. The system of claim 3 wherein said predetermined type of microinstruction is an unconditional branch microinstruction including a plurality of fields, one of said fields coded to contain a branch address designating said next storage location to be referenced during a next cycle of operation and an op code field coded to specify said predetermined type of microinstruction and wherein said read only store includes means coupled to said decoding means and to said address register, said means being responsive to said signals to condition said address register for receiving signals representative of said branch address.

5. The system of claim 2 wherein said one of said sections includes a plurality of bit storage locations, each of said bit storage locations being set to a first state for indicating when at least a corresponding one of the storage locations in said number of sections is to be altered and said each bit storage location being set to a second state when said corresponding storage location is not to be altered.

6. The system of claim 5 wherein the storage locations of said another section are coded to store address signals designating a first storage location within said predetermined one of said sections storing a first microinstruction word to be substituted in place of microinstruction word contents of said storage locations of said number of sections requiring alteration.

7. The system of claim 6 wherein each of said plurality of sections includes a plurality of programmable read only memory arrays.

8. The system of claim 7 wherein said predetermined one of said number of sections is assigned the highest numerical address and wherein said address control means includes means for loading a predetermined portion of said address register with a value for addressing said predetermined one section.

9. A microprogrammed system having a unit including a read only store having a plurality of similar addressable sections, each section including the same number of storage locations for storing microinstruction words for decoding by said unit, an address register coupled to said sections for storing an address identifying storage locations to be referenced during the cycling of said store, an output register having an input operatively coupled to said sections for receiving the microinstruction word contents of a referenced storage location of one of said sections and an output for applying the decoded contents to various points within said system for controlling its operation, said unit further including correcting apparatus comprising:

a first addressable read only section coupled to said address register and to said input of said output register, said first section including a plurality of storage locations coded for storing microinstructions to be substituted for microinstructions stored in said plurality of sections;

a second addressable read only section coupled to said address register and including a plurality of storage locations, each including a plurality of bits coded to indicate when a microinstruction stored in an associated storage location in one of said plurality of sections requires modification;

a third addressable read only section coupled to said address register and including a plurality of storage locations coded to store addresses, each designating a first storage location in said first section containing a first microinstruction which is to be substituted for a microinstruction of an associated storage location in one of said plurality of sections; and, control means coupled to said input of said output register, said address register, said second and third sections, said control means including logic means connected to be responsive to signals from said second addressable read only section during a first cycle of operation indicating said modification to inhibit transfer of the microinstruction word contents of said associated storage location of one of said group of sections and control logic means coupled to said logic means and responsive to said signals to apply the address read out during said first cycle of operation from a storage location of said third addressable read only section corresponding to said associated storage location to said address register for addressing the designated storage location in said first addressable read only section during a next cycle of operation for execution of a first substitue microinstruction.

10. The microprogrammed controlled system of claim 9 wherein said system further includes increment circuit means coupled to said address register, said increment circuit means being operative to increment the contents of said address register by one for each cycle of operation for addressing successive storage locations of said first addressable read only section.

11. The system of claim 10 wherein said system further includes sequence control means coupled to receive said microinstruction word contents of said referenced location and coupled to said address register and wherein a storage location following said first location in said first section of said correction apparatus is coded to contain a predetermined type of microinstruction in a microinstruction sequence substituted for the microinstruction stored in said associated storage location, said sequence control means being operative in response to said predetermined type of microinstruction to condition said address register to reference a succeeding storage location of said one of said plurality of sections during a next cycle of operation.

12. The system of claim 11 wherein said predetermined type of microinstruction is an unconditional branch type microinstruction positioned at the end of said microinstruction sequence to define the completion thereof, said branch type microinstruction including an op code field portion and branch address field portion and wherein said sequence control means includes branch control means conditioned by said op code field portion to load signals representative of said branch address into said address register designating said succeeding storage location.

13. The system of claim 9 wherein said second addressable read only section includes a plurality of bit storage locations, each of said plurality of bit storage locations being set to a first state for indicating when at least a corresponding one of the storage locations of said plurality of sections requires modification and said each bit location being set to a second state for indicating when said corresponding one of said storage location does not require modification.

14. The system of claim 13 wherein said plurality of sections, said first, said second and said third sections, each are constructed of programmable read only memory arrays.

15. The system of claim 14 wherein said first addressable read only section constitutes a section within said read only store assigned the maximum address values and wherein said control logic means includes means responsive to said signals apply signals to said address register concurrent with said address for causing the addressing of said frist addressable section.

16. A control store comprising:

a first plurality of addressable programmable read only sections, each of said sections including a like number of storage locations for storing microinstructions and at least a predetermined one of said first plurality of sections coded to store microinstructions which are to be substituted for microinstructions stored in the remaining ones of said first plurality of said sections;

a second plurality of concurrectly addressable programmable read only sections, one of said second plurality of sections for storing signals indicating when the microinstruction contents of a storage location of said remaining ones of said first plurality of sections and another one of said second plurality of sections storing escape address signals designating a first microinstruction within said predetermined one of said first sections;

address register means coupled to said first and second plurality of read only sections for referencing a storage location within one of said first plurality of sections concurrently with storage locations within said one and said another one of said second plurality of sections during a cycle of operation;

output register means coupled to said first plurality of sections for receiving the microinstruction word contents of said storage location of said one of said first plurality of sections; and, control means coupled to said second plurality of sections, said control means including first logic circuit means responsive to a signal from a storage location within said one of said second plurality of sections to inhibit the transfer of the microinstruction contents of said storage location within said one of said first plurality of sections during said cycle of operation;

and second logic circuit means being responsive to said signal to apply address signals from a storage location within said another one of said second plurality of sections for addressing a storage location containing a first substitute microinstruction within said predetermined one of said first sections during the next cycle of operation.

17. The control store of claim 16 further including decoding means coupled for receiving signals representative of the type of microinstructions read out from said first plurality of sections, said decoding means being conditioned by a predetermined type of microinstruction read out from said predetermined one of said first sections to generate signals to cause said control store to reference a next sequential storage location in said one of said first plurality of sections.

18. The control store of claim 17 further including incrementing circuit means coupled to said address register, said incrementing means being operative during each cycle of operation to increment by one the contents of said address register for addressing successive locations in said predetermined one of said first plurality of said sections until read out of said predetermined type of microinstruction.

19. The control store of claim 18 wherein said predetermined type of microinstruction is an unconditional branch microinstruction including a plurality of fields, one of said fields coded to contain a branch address designating said next sequential storage location and an op code field coded to specify an unconditional branch operation and wherein said control store includes means coupled to said decoding means and to said address register, said means being responsive to said signals to condition said address register for receiving said branch address.

20. The control store of claim 16 wherein said one of said second plurality of sections includes a plurality of sentinel bit storage locations, each of said bit storage locations being set to a first state for indicating when at least a corresponding one of said storage locations concurrently addressed in said first plurality of sections is to be changed and said each bit storage location being set to a second state when said corresponding storage location is not to be changed.

21. The control store of claim 20 wherein said predetermined one of said first plurality of sections is assigned the highest numerical addresses and wherein said second logic circuit means includes means for loading a predetermined portion of said address register with a value for addressing said predetermined one of said first plurality of sections during said next cycle of operation.

22. A method of altering the fixed microinstruction word coding of a cycled read only control store having a plurality of addressable original storage sections, each section including the same number of storage locations for permanently storing different sequences and types of microinstruction words for controlling the operation of a processing unit associated therewith, said method comprising the steps of:

1. coding a first new section for permanently storing microinstruction sequences to be substituted for microinstructions of the remaining original sections;
2. inserting said new section in place of the section having the highest addresses;
3. coding a second section to designate which of the storage locations within said remaining original storage sections are to be altered;
4. coding a third section to designate addresses indicating a first one of the microinstructions in said new section to be substituted for an altered storage location;
5. addressing during each cycle of operation a storage location in one of said remaining original sections concurrent with corresponding storage locations in said second and third sections;
6. inhibiting execution of the microinstruction read out of said storage location in said one of said remaining original sections when the contents of the storage location indicates that alteration is required; and
7. addressing during the next cycle of operation said first one of the microinstructions in said new section designated by the address storage location contents of said third section for execution by said data processing unit.

23. The method of claim 22 further including the step of coding each of said microinstruction sequences to include an unconditional branch type microinstruction for returning said read only control store to a next storage location in said one of said remaining original sections at the completion of each said sequence.

* * * * *